US012688374B2

(12) United States Patent
Clement et al.

(10) Patent No.: US 12,688,374 B2
(45) Date of Patent: Jul. 21, 2026

(54) CUSTOMIZED PROMPT GENERATION SERVICE FOR SOFTWARE ENGINEERING TASKS

(71) Applicant: MICROSOFT TECHNOLOGY LICENSING, LLC., Redmond, WA (US)

(72) Inventors: Colin Bruce Clement, Seattle, WA (US); Shengyu Fu, Redmond, WA (US); Spandan Garg, Seattle, WA (US); Neelakantan Sundaresan, Bellevue, WA (US); Dongjiang You, Kirkland, WA (US); Roshanak Zilouchian Moghaddam, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 420 days.

(21) Appl. No.: 18/209,935

(22) Filed: Jun. 14, 2023

(65) Prior Publication Data

US 2024/0419917 A1 Dec. 19, 2024

(51) Int. Cl.

| | |
|---|---|
| ***G06F 9/44*** | (2018.01) |
| ***G06F 8/77*** | (2018.01) |
| ***G06F 9/445*** | (2018.01) |
| ***G06F 9/45*** | (2006.01) |
| ***G06F 9/455*** | (2018.01) |
| ***G06F 40/40*** | (2020.01) |
| ***G06N 20/00*** | (2019.01) |

(52) U.S. Cl.
CPC ................ *G06F 40/40* (2020.01); *G06F 8/77* (2013.01); *G06N 20/00* (2019.01)

(58) Field of Classification Search
CPC ............ G06F 40/40; G06F 8/77; G06N 20/00
See application file for complete search history.

(56) References Cited

U.S. PATENT DOCUMENTS

| | | | | |
|---|---|---|---|---|
| 11,934,801 | B2 * | 3/2024 | Rahmani | G06F 8/33 |
| 12,346,673 | B1 * | 7/2025 | Gonugondla | G06F 40/20 |
| 12,411,841 | B2 * | 9/2025 | Almaer | G06F 8/30 |
| 2022/0413847 | A1 * | 12/2022 | Bulut | G06F 8/10 |
| 2023/0169164 | A1 * | 6/2023 | Bishop, III | G06F 21/563 726/23 |

(Continued)

OTHER PUBLICATIONS

Zhenchang Xing, Prompt Sapper: LLM—Empowered Software Engineering Infrastructure for AI-Native Services, 2023, pp. 1-8. https://arxiv.org/pdf/2306.02230 (Year: 2023).*

(Continued)

*Primary Examiner* — Mongbao Nguyen
(74) *Attorney, Agent, or Firm* — Workman Nydegger

(57) ABSTRACT

A customized prompt generation service automates prompts to a large language model to perform a specified software engineering task. The service stores the custom data of a client that includes code diff hunks, source code segments, code reviews, repaired code, and unit tests from a code base or repository of the client. Prompt templates are associated with each software engineering task that include the requisite information needed for the large language model to perform the target task. A prompt to a large language model includes examples of the software engineering task from the custom data of the client of the service.

20 Claims, 11 Drawing Sheets

(56) References Cited

U.S. PATENT DOCUMENTS

| | | | | |
|---|---|---|---|---|
| 2023/0305822 | A1* | 9/2023 | Ferrucci | G06F 8/41 |
| 2024/0289103 | A1* | 8/2024 | Cooper | G06F 8/433 |
| 2024/0311652 | A1* | 9/2024 | Kulkarni | G06N 3/045 |
| 2024/0330579 | A1* | 10/2024 | Saxena | G06F 40/106 |
| 2024/0362209 | A1* | 10/2024 | Almaer | G06F 16/245 |
| 2024/0403792 | A1* | 12/2024 | Goutal | G06Q 10/06398 |

OTHER PUBLICATIONS

Rizel Scarlett, A Beginner's Guide to Prompt Engineering with GitHub Copilot, Apr. 2023, pp. 1-16. https://blackgirlbytes.dev/a-beginners-guide-to-prompt-engineering-with-github-copilot (Year: 2023).*

Jules White, ChatGPT Prompt Patterns for Improving Code Quality, Refactoring, Requirements Elicitation, and Software Design, Mar. 2023, pp. 1-14. https://arxiv.org/pdf/2303.07839 (Year: 2023).*

Zimin Chen, Neural Transfer Learning for Repairing Security Vulnerabilities in C Code, 2022, pp. 1-20. https://arxiv.org/pdf/2104.08308 (Year: 2022).*

Wai Kin Wong, Deceiving Deep Neural Networks-Based Binary Code Matching with Adversarial Programs, 2022, pp. 1-12. https://ieeexplore.ieee.org/stamp/stamp.jsp?tp=&arnumber=9978244 (Year: 2022).*

Zhiyu Fan, Automated Repair of Programs from Large Language Models, Jan. 2023, pp. 1-12. https://arxiv.org/pdf/2205.10583 (Year: 2023).*

International Search Report and Written Opinion received for PCT Application No. PCT/US2024/032461, Sep. 9, 2024, 16 pages.

Nashid, et al., "Retrieval-Based Prompt Selection for Code-Related Few-Shot Learning" IEEE 45th International Conference on Software, May 14, 2023, pp. 2450-2462.

Storbelt, et al., "Interactive and Visual Prompt Engineering for Ad-hoc Task Adaptation with Large Language Models", IEEE transactions on visualization and computer graphics, vol. 29, Issue No. 1, Aug. 16, 2022, 11 Pages.

White, et al., "A prompt pattern catalog to enhance prompt engineering with chatgpt.", arXiv preprint arXiv:2302.11382, Feb. 21, 2023, 19 Pages.

International Preliminary Report on Patentability (Chapter I) received for PCT Application No. PCT/US2024/032461, mailed on Dec. 26, 2025, 13 pages.

* cited by examiner

CODE REVIEW
PROMPT SERVICE
300

START

OBTAIN CODE DIFF HUNK(S) OF TARGET SOURCE CODE   302

RUN CODE QUALITY CLASSIFIER ON EACH CODE DIFF HUNK TO DETERMINE WHICH CODE DIFF HUNKS ARE MOST LIKELY TO HAVE CODE REVIEW ISSUES (BUGS, FORMAT PROBLEMS, ETC.)   304

SELECT TOP-K CODE DIFF HUNKS MOST LIKELY NEEDING CODE REVIEW   306

FOR EACH TOP-K CODE DIFF HUNKS   308

GENERATE CODE DIFF HUNK EMBEDDING AS INDEX TO RETRIEVAL-AUGMENTED DATA STORE  310

OBTAIN RETRIEVAL-AUGMENTED EXAMPLES OF CLIENT   312

FORMAT PROMPT USING CODE DIFF PROMPT TEMPLATE AND RETRIEVAL-AUGMENTED EXAMPLES  314

SEND PROMPT TO LARGE LANGUAGE MODEL   316

RECEIVE CODE REVIEW FROM LARGE LANGUAGE MODEL AND OUTPUT   318

GENERATE FIX?   320    NO, PROCESS NEXT CODE DIFF HUNK, IF ANY 322

YES

GENERATE NEXT PROMPT INCLUDING PREVIOUS PROMPTS  324

RETURN

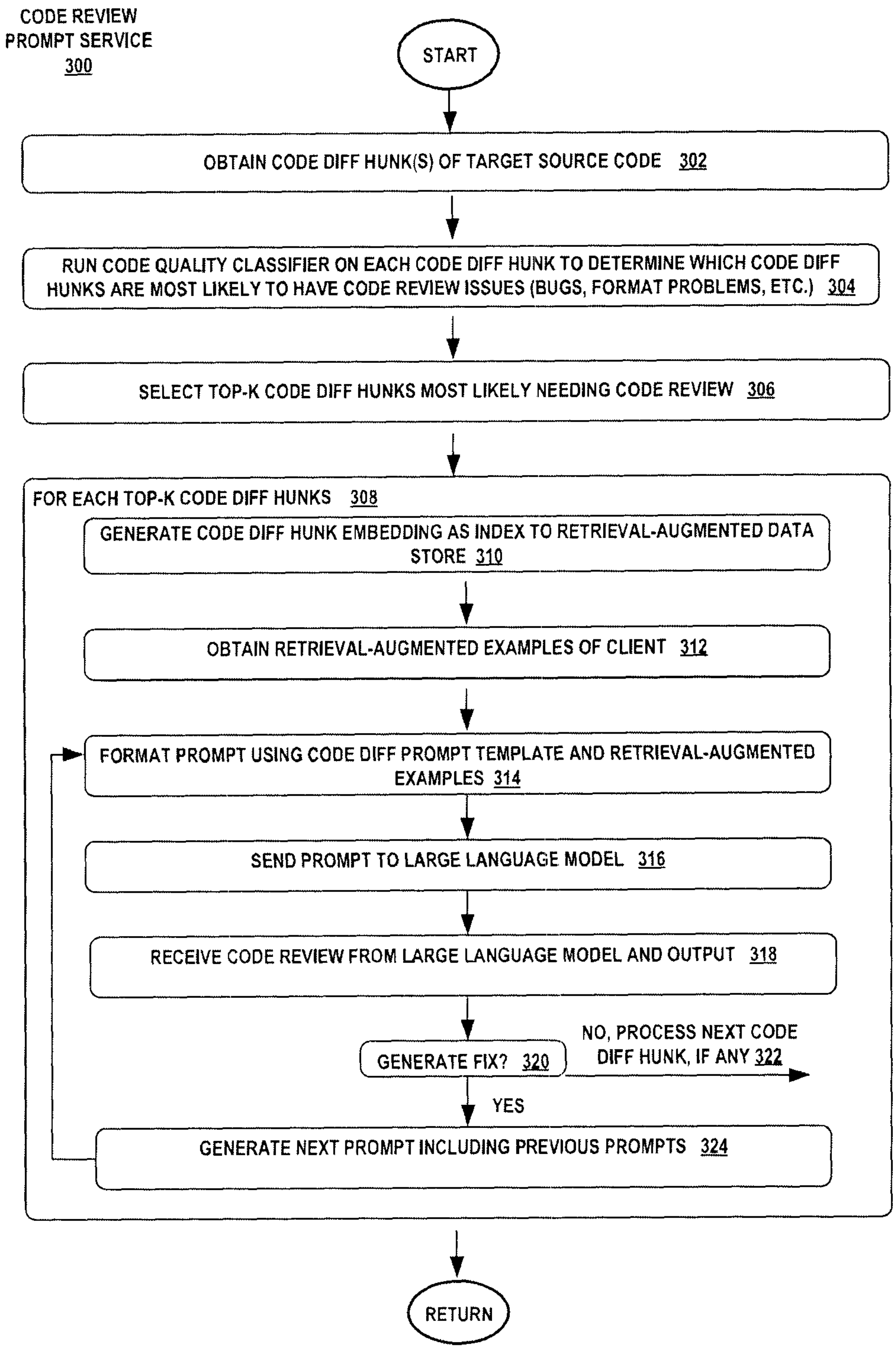

*FIG. 3*

CODE REVIEW PROMPT
TEMPLATE 400

402 — Given an initial version of the following source code file:

<Source Code>

404 — Review the proposed code change:
<code_diff hunk>

406 — Below are code reviews for similar code changes:
<code review1>

...

<code review k>

408 — Comment on how this code change can be improved, except for adding comments, document and unit tests. Keep the answer short and concise. Give no more than two suggestions and write in bullet point format '-'.

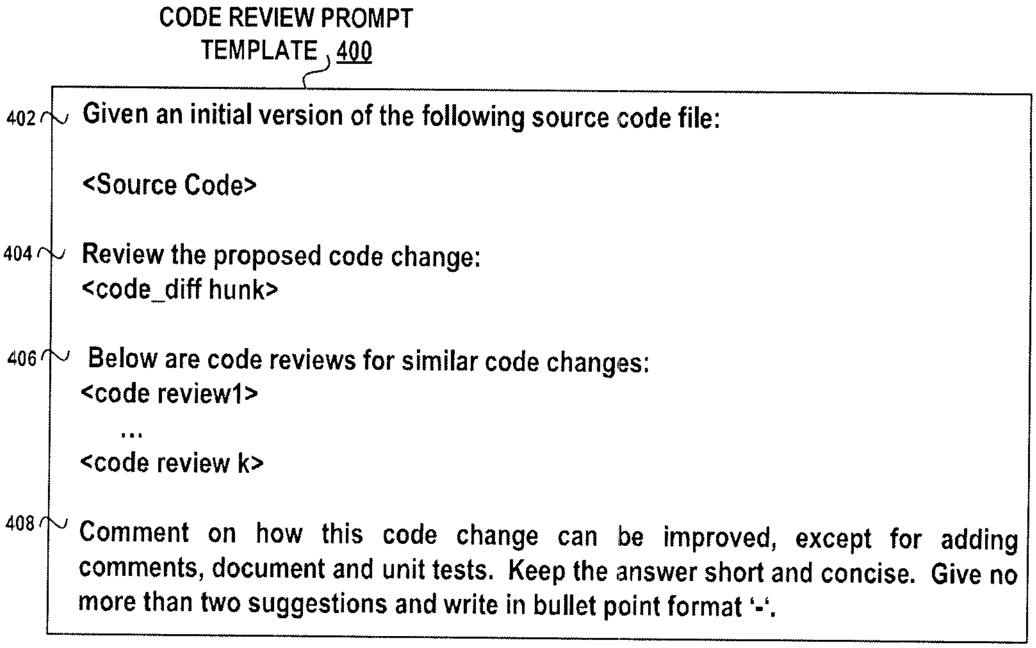

*FIG. 4*

CODE SEARCH
PROMPT SERVICE 500

START

OBTAIN QUERY   502

MAP QUERY INTO EMBEDDING   504

SELECT TOP-K CLOSEST CODE SEGMENTS FROM RETRIEVAL-AUGMENTED DATA STORE 506

GENERATE PROMPT INCLUDING TOP-K CLOSEST CODE SEGMENTS 508

SEND PROMPT TO LARGE LANGUAGE MODEL   510

RECEIVE SEARCH RESULTS FROM LARGE LANGUAGE MODEL   512

RETURN

CODE SEARCH PROMPT
TEMPLATE 600

602   Here are the sources:

604   \<Reference #1\>

...
    \<Reference #k\>

606   Between the first reference and the last reference above are code snippets from different files of a developer's codebase or repository. Try to use one of the above code snippets to answer the question below. If the question involves a search, the response should include the relevant code in the answer.

608   \<Question\>

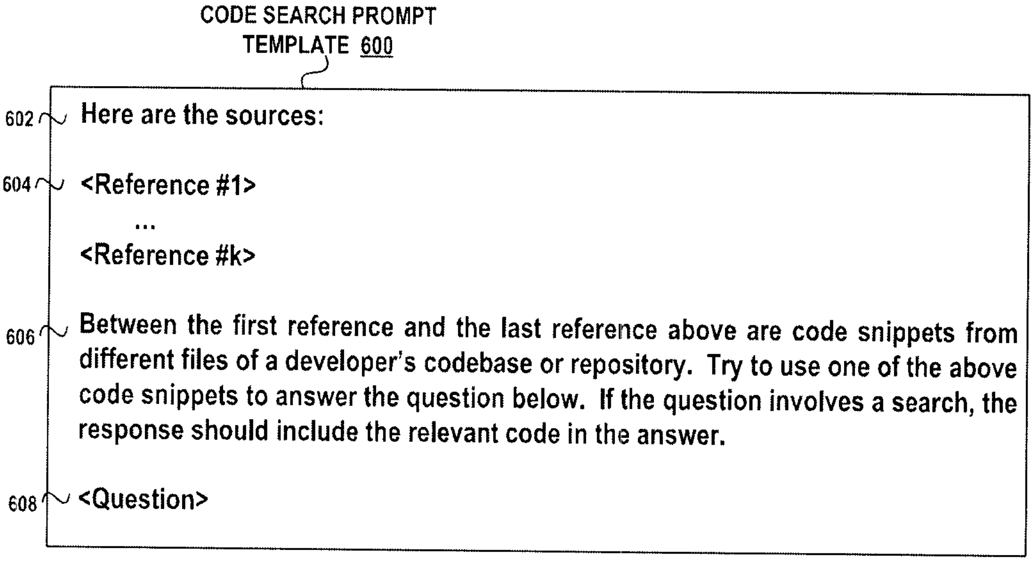

*FIG. 6*

VULNERABILITY
REPAIR PROMPT
SERVICE 700

START

OBTAIN QUERY AND SOURCE CODE   702

RUN STATIC ANALYZER TO DETERMINE VULNERABILITY TYPE AND LOCATION OF
VULNERABILITY IN SOURCE CODE   704

GENERATE EMBEDDING OF VULNERABILITY TYPE   706

OBTAIN TOP-K CLOSEST RETRIEVAL-AUGMENTED FIXES FOR THE VULNERABILITY TYPE   708

GENERATE PROMPT INCLUDING TOP-K CLOSEST RETRIEVAL-AUGMENTED VULNERABILITY FIXES,
VULNERABILITY TYPE, TOKENS ASSOCIATED WITH THE IDENTIFIED VULNERABILITY, AND
VULNERABLE SOURCE CODE   710

SEND PROMPT TO LARGE LANGUAGE MODEL   712

RECEIVE VULNERABILITY FIX FROM LARGE LANGUAGE MODEL   714

GENERATE REPAIRED CODE, COMPILE, AND EXECUTE UNIT TESTS   716

ERROR?   718        NO        OUTPUT REPAIRED CODE 720

YES

GENERATE CONTINUATION PROMPT FOR LARGE LAGUAGE MODEL TO FIX REPAIRED CODE   722

RECEIVE FIX FROM LARGE LANGUAGE MODEL   724

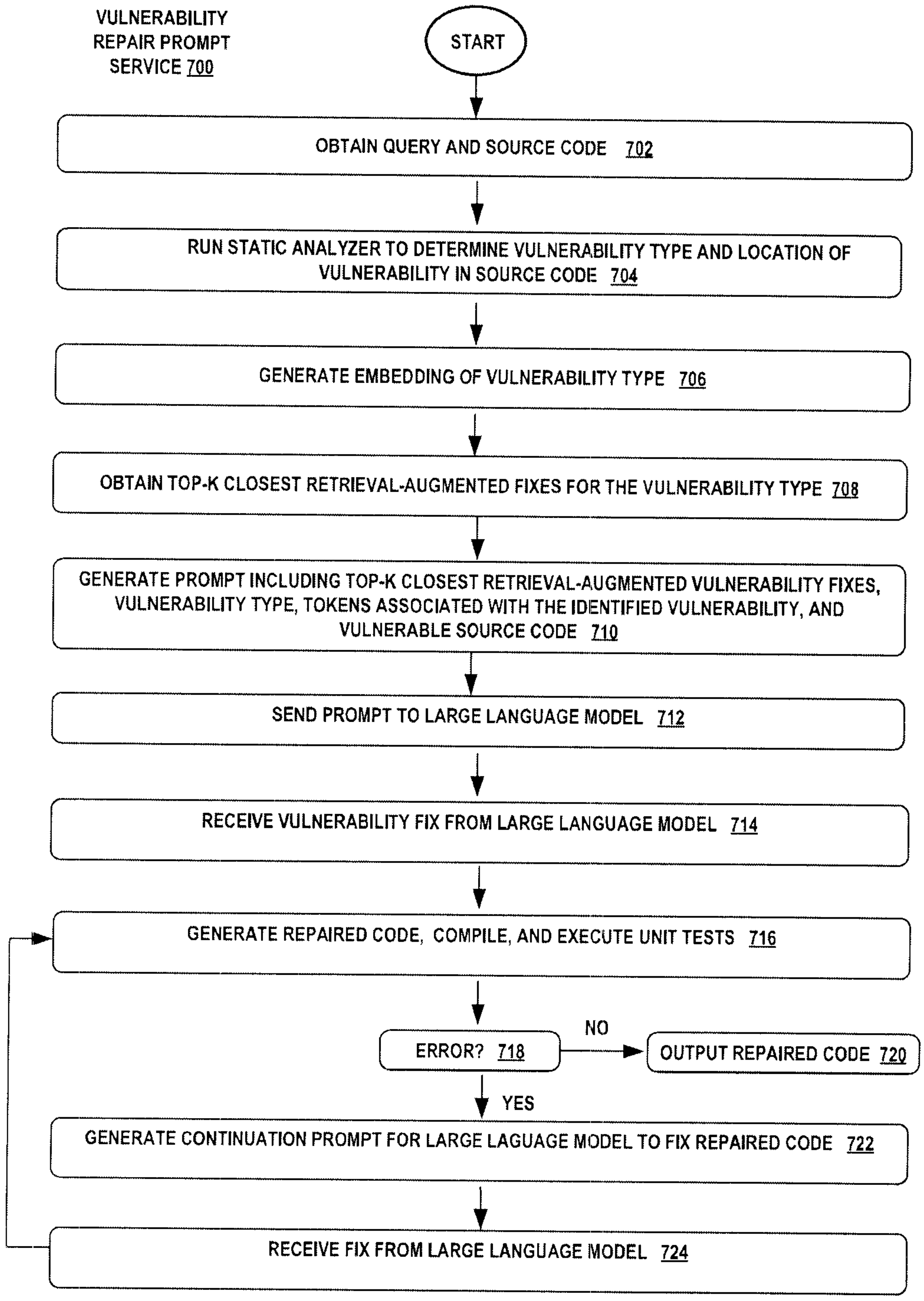

*FIG. 7*

BUG REPAIR PROMPT TEMPLATE <u>800</u>

802 — You are fixing a security vulnerability. A trusted tool has flagged the following vulnerability in the code : <BUG TYPE> which is described as follows: <WARNING MESSAGE>

804 — <CODE DIFF 1>

....

<CODE DIFF N>

806 — The code snippet to fix is:

<CONTEXT><BUGGY CODE SNIPPET>

808 — Write the fixed version of the code in the diff format. There is no need to complete the scope since there is code that follows after this in the rest of the file.

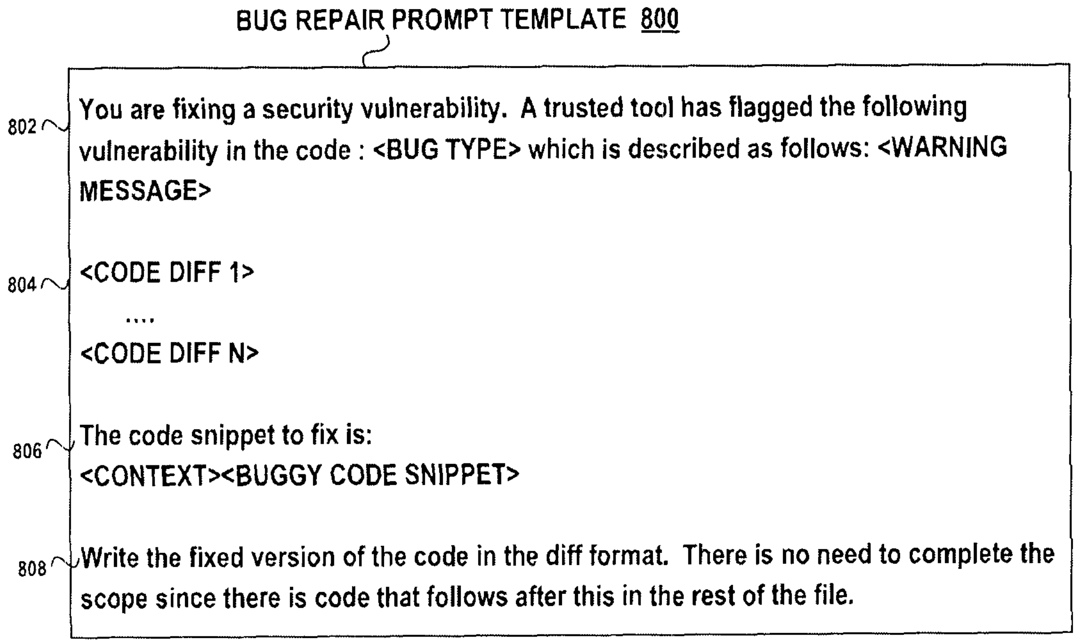

*FIG. 8*

UNIT TEST PROMPT TEMPLATE 1000

1002  Given the following source code:

1004  <Source Code>

1006  Complete the following Test Class with a TestMethod for the method:
      <method name>

1008  public class Test_{method_name}
      {
          [TestMethod]

CUSTOMIZED PROMPT GENERATION SERVICE FOR SOFTWARE ENGINEERING TASKS

BACKGROUND

Large language models are a type of machine learning model that is used to perform a variety of tasks that include question answering, writing messages, fraud detection, spam filtering, malware thread detection, business process automation, and the like. A large language model is trained on massive amounts of data and typically contains billions of parameters. The large language model is given a prompt which instructs the large language model on the task to be performed. The accuracy of the response from the large language model depends on a well-crafted prompt to ensure that the model understands the task that has to be performed in order for the model to generate a relevant and meaningful response.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A customized prompt generation service automates prompts to a large language model to perform a specific software engineering task. The service stores the custom data of a client that includes code changes to the codebase of the client in the form of code diff hunks, source code segments of the source code files of the codebase, code reviews, repaired code, and unit tests associated with the source code files of the codebase of the client. Prompt templates are associated with each software engineering task that include the requisite information needed for the large language model to perform the target task and generate a relevant output. A prompt to a large language model includes examples of the software engineering task from the customized data of the client of the service.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF DRAWINGS

FIG. 3 is a flow diagram illustrating an exemplary method of the code review prompt service.

FIG. 4 is a schematic diagram illustrating an exemplary code review prompt template.

FIG. 6 is a schematic diagram illustrating an exemplary code search prompt template.

FIG. 7 is a flow diagram illustrating an exemplary method of the vulnerability repair prompt service FIG. 8 is a schematic diagram illustrating an exemplary vulnerability repair prompt template.

DETAILED DESCRIPTION

Overview

The present disclosure relates to the automation of customized prompts to a large language model that pertain to the performance of a software engineering task. A software engineering task is an automated activity used to create, develop, maintain, and/or test source code. A software engineering task includes, without limitation, code search, code performance review, unit test generation, code review, software bug detection, software repair code generation, code generation, and the like. A well-crafted prompt requires specific content for the model to understand the particular software engineering task and to perform the task as intended. Developers not familiar with the nuances of a software engineering task and the idiosyncrasies of the large language model often need assistance in crafting a prompt to achieve the best results.

The software engineering tasks all require an understanding of source code. Source code differs from a natural language (e.g., English) since programmers use, at times, arbitrary, complex and long names to represent a variable, function or other code elements. Source code can be learned from a large unsupervised abundant corpus of code snippets from different programming languages and/or from natural language code summaries from which a large language model learns statistical properties of the source code, such as syntactic rules of the programming languages, as well as semantic information from co-occurrence of specific variable and method names.

Large language models are often trained on natural language text from publicly-available sources or code repositories. The large language models are often not trained on customized source code from private code repositories and as such, often generate poor responses when given unseen data. To overcome this situation, the prompt service includes in a prompt a few labeled customized samples of the software engineering task from the client's data. In this manner, the large language model is able to generate a more relevant and targeted response.

The customized prompt generation service automates the construction of a prompt utilizing prompt templates specific to a software engineering task. The prompt template specifies the content of a prompt and the order of the content.

Attention now turns to a more detailed description of the system, method, and components used in the customized prompt generation service.

System

Figure 1:
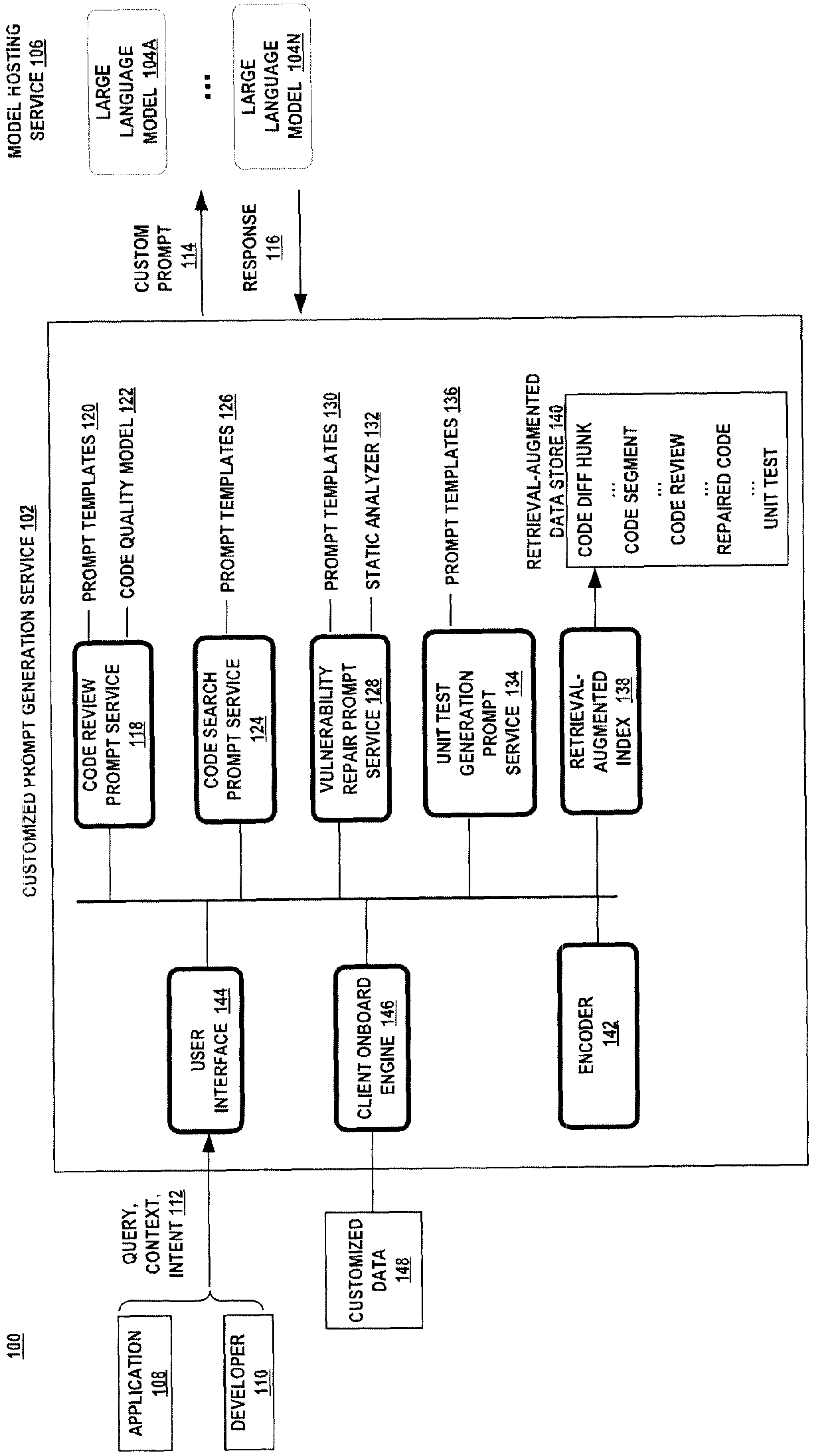
FIG. 1 is a schematic diagram illustrating an exemplary customized prompt generation web service.

FIG. 1 represents an exemplary system 100 for generating a customized prompt for a large language model to perform a software engineering task. The system includes a customized prompt generation service 102 that interacts with a large language model 104A-104N ("104") of a model hosting service 106 to perform a specific software engineering task. In an aspect, the client, such as an application 108 or developer 110 (e.g., user, enterprise, etc.) establishes a relationship with the customized prompt generation service to onboard their custom data from a codebase or repository to the service 102. A client onboard engine 146 stores the custom data into the retrieval-augmented data store 140 and generates an embedding for each item to access the item in the data store. The embeddings are stored in the retrieval-augmented index 138. The custom data includes source code artifacts such as code segments from code files (script files, source code, build files, etc.), unit tests, code changes (code diff hunks), code reviews, repaired code, etc.

Thereafter, the client submits a natural language request 112 for which a custom prompt 114 is created for the large language model to perform a specific software engineering task and generate a response 116. The request 112 is associated with one of the software engineering tasks offered by the customized prompt generation service. The request 112 includes a query and optionally, a context and intent.

In an aspect, the customized prompt generation service 102 includes a code review prompt service 118, a code search prompt service 124, a vulnerability repair prompt service 128, and a unit test generation service 134. A retrieval-augmented data store 140 includes the customized data of a client obtained from the client's codebase and/or repository. The client's data stored in the retrieval-augmented data store is accessed by a retrieval-augmented index 138. In an aspect, the retrieval-augmented index 138 is an embedding that is generated by an encoder 142.

The customized prompt generation service 102 includes a user interface 144 that interacts with a client 108, 110. The user interface 144 accepts requests in the form of a conversation, through an application programming interface (API), or through menus of the user interface. A request may include a query, a context, and/or an intent 112. The query is a request for an action, the context is the subject of the action, such as source code, code diff hunks, or a URL, and the intent specifies the software engineering task related to the action. The user interface 144 routes the request to a target service based on the intent derived from the request.

The customized prompt generation service 102 interacts with a model hosting service 106 that hosts the large language models 104 as a service. The customized prompt generation service 102 may interact with the model hosting service 106 through API calls to an endpoint of a corresponding large language model.

In an aspect, a large language model 104 is a neural transformer model with attention. A neural transformer model with attention is one distinct type of machine learning model. Machine learning pertains to the use and development of computer systems that are able to learn and adapt without following explicit instructions by using algorithms and statistical models to analyze and draw inferences from patterns in data. Machine learning uses different types of statistical methods to learn from data and to predict future decisions. Traditional machine learning includes classification models, data mining, Bayesian networks, Markov models, clustering, and visual data mapping.

Deep learning differs from traditional machine learning since it uses multiple stages of data processing through many hidden layers of a neural network to learn and interpret the features and the relationships between the features. Deep learning embodies neural networks which differs from the traditional machine learning techniques that do not use neural networks. Neural transformers models are one type of deep learning that utilizes an attention mechanism. Attention directs the neural network to focus on a subset of features or tokens in an input sequence thereby learning different representations from the different positions of the tokens in an input sequence. The neural transformer model handles dependencies between its input and output with attention and without using recurrent neural networks (RNN) (e.g., long short-term memory (LSTM) network) and convolutional neural networks (CNN).

There are various configurations of a neural transformer model with attention and the model hosting service hosts the models in the various configurations. A large language model may be configured as an encoder-decoder neural transformer model with attention, a decoder neural transformer model with attention, or an encoder neural transformer model with attention. The encoder-decoder neural transformer model with attention consists of a series of stacked encoder blocks coupled to a series of stacked decoder blocks. The decoder neural transformer model with attention consists only of stacked decoder blocks and the encoder neural transformer model with attention consists only of stacked encoder blocks.

In an aspect, the large language models 104 are pre-trained on natural language text and source code. The training of a large language model requires a considerable amount of training data and computing resources which makes it impossible for some developers to create their own models. Instead, the model hosting service 106 offer access to various large language models as a cloud service to developers. Examples of the large language models include the conversational pre-trained generative neural transformer models with attention offered by OpenAI (i.e., chat GPT models), Codex CoPilot, or other GPT models trained on source code and natural language text.

The code review prompt service 118 determines whether or not changes to a source code file need to be reviewed. The code review prompt service 118 utilizes a code quality model 122 to determine whether a code review is needed. When the code quality model 112 determines that code review is needed, a prompt is generated based on a prompt template 120 for the large language model to generate the code review. The prompt is given customized examples of previous code reviews of the client which are contained in the retrieval-augmented data store 140.

The code search prompt service 124 searches for source code satisfying a query. The large language model does not have access to perform the search in the client's codebase or repository. Instead, code segments from the client's codebase or repository are stored in the retrieval-augmented data store. The code search prompt service 124 performs a search of the code segments in the retrieval-augmented data store for the closest code segments matching the query. The prompt is given the closest code segments from the retrieval-augmented data store for the large language model to perform the search.

The vulnerability repair prompt service 128 determines whether or not a source code snippet contains a software vulnerability. A software vulnerability is a programming defect that causes significant performance degradation, such as excessive resource usage, increased latency, reduced throughput, and overall degraded performance or is exploited for malicious intent. A software vulnerability differs from source code bugs, such as functional bugs, compiler errors and runtime errors since they do not produce an erroneous result. Software vulnerabilities are difficult to detect due to the absence of fail-stop symptoms.

In an aspect, the vulnerability repair prompt service 128 includes prompt templates 130 and a static analyzer 132. The static analyzer 132 determines the type of vulnerability and the location of the vulnerability in a given source code snippet. The static analyzer 132 discovers software vulnerabilities over a codebase or source code repository without executing and building the source code program to discover the software vulnerability. Examples of a static analyzer include, without limitation, Infer, CodeQL, source code security analyzers (i.e., BASH, dotTEST, etc.), and the like. A compiler differs from a static analyzer since the compiler detects syntax errors which differ from a software vulnerability.

Upon detection of a software vulnerability by the static analyzer 132, the large language model 104 is used to generate source code to repair the vulnerability. The large language model 104 is given examples of previous fixes made to fix the same type of software vulnerability in the prompt. The vulnerability repair service 128 receives the repair code predicted by the large language model and tests the repair code. The service 128 compiles the repair code and if a unit test is attached in the request, executes the unit test on the repair code to ensure that the repair code is valid. If the repair code does not compile successfully or execute the unit test successfully, the service continues the conversation with the large language model to fix the repair code.

The unit test generation prompt service 134 generates a unit test for a source code snippet. The unit test generation prompt service 134 searches in the retrieval-augmented data storage for similar source code having a unit test. The service 134 generates a prompt, based on the prompt templates 136 associated with the service, that includes instructions for the large language model to generate a unit test for a given source code snippet. The prompt includes the instructions, similar source code and the associated unit tests retrieved from the retrieval-augmented data store 140. The service may then test the unit test generated by the large language model to ensure that the predicted unit test operates as intended. In the event, the predicted unit test is faulty, the unit test generation prompt service continues the conversation with the large language model to fix the faulty unit test.

It should be noted that the techniques described herein are not limited to the specific software engineering tasks described herein and that the techniques describe herein apply to other software engineering tasks, such as code completion, code generation, code translation, code migration, and the like.

Methods

Attention now turns to description of the various exemplary methods that utilize the system and device disclosed herein. Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 2:
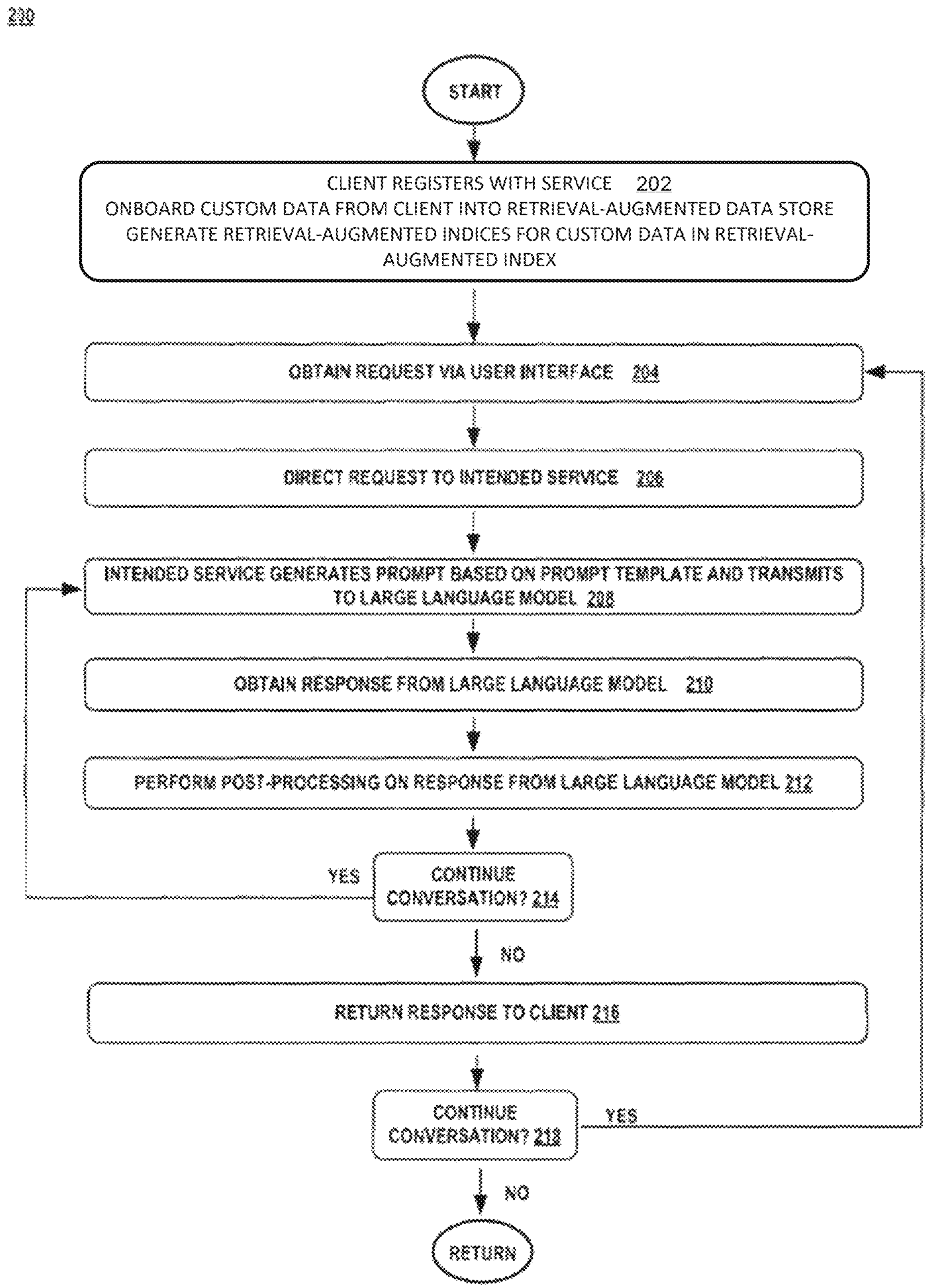
FIG. 2 is a flow chart illustrating an exemplary method of the customized prompt generation web service.

FIG. 2 illustrates an exemplary method of the custom prompt generation service. Referring to FIGS. 1 and 2, initially, a client registers with the customized prompt generation service. The client onboard engine 146 uploads to the customized prompt generation service 102 the custom data of the client from its codebase and/or code repository. The client onboard engine 146 stores the custom data in the retrieval-augmented data store 140. The custom data includes source code artifacts, such as code segments from each source code file in a codebase or code repository of the client, code diff hunks from pull requests of a version control system of the client, code reviews from a version control system of the client, and code changes to repair a software vulnerability from a version control system of the client. (Collectively, block 202).

The client onboard engine 146 generates an index for each item that is stored in the retrieval-augmented data store 140. The index is generated by the encoder 142 and stored in the retrieval-augmented index 138 and used to fetch the corresponding data in the retrieval-augmented data store 140. The index for a code diff hunk is an embedding of the code diff hunk, the index for a code segment is an embedding of the code segment, the index for a code review is an embedding of the code diff hunk associated with the changes that are subject to the code review, and the index for a repaired code is an embedding of the vulnerability type of the vulnerability associated with the repaired code. (Collectively, block 202).

The customized prompt generation service 102 receives a request. The request is initiated from the user interface 144 through a chat box or through a user menu selection. The user interface includes a menu that includes a button for each software engineering service. A developer may initiate a software engineering service through selection of the service's button which then prompts the developer for information regarding the task. Alternatively, the user may issue a request in a chat box. (Collectively, block 204).

The user interface 144 directs the request to the intended service. The request includes a query, context and intent 112. The query is a natural language description of the action the developer wants to perform. The intent is the particular software engineering task. At times, the request may not include the intent and the user interface uses a set of rules to determine the intent and forwards the request to the intended service. (Collectively, block 204).

The intended service generates a prompt based on a respective prompt template and transmits the prompt to a respective large language model (block 208). Each prompt includes retrieval-augmented examples of the task associated with the client. The retrieval-augmented data store contains code segments, code reviews, code diff hunks and repaired code segments, each of which has a corresponding embedding. The embedding is used to find the closest-matching entry to the query. The search of the retrieval-augmented data store uses a k-nearest neighbor search. The k-nearest neighbor search searches for a query embedding that is similar to an embedding of the data in the retrieval-augmented data store based on a similarity function, such a Euclidean distance, Manhattan distance, cosine similarity and the like. (Collectively, block 208).

A response from the large language model is obtained (block 210). A post-processing action may be performed on the response to ensure that the response addresses the query (block 212). If the response is not adequate (block 214—yes), the service may continue the conversation with the large language model for additional data (block 208).

The service creates an additional prompt to alleviate any issues detected by the post processing actions (block 208). The additional prompt includes the previously-transmitted prompts since the large language model does not save context information from previous prompts of the conversation.

If the response from the large language model is adequate (block 214—no), the service returns the response to the client (block 216). The client may continue the conversion by issuing further requests (block 218—yes) which are processed until there are no further requests (block 218—no).

Attention now turns to a further description of the code review prompt service. Turning to FIG. 3, there is shown an exemplary method 300 of the code review prompt service.

Code or peer review is a process that is often utilized during software development where the source code under development is reviewed by one or more peers of the author of the source code. The source code is often inspected to discover errors, to ensure that the source code complies with best practice standards and to discover vulnerabilities, such as race conditions, malware, memory leaks, buffer overflows, format string exploits, and the like. Code review is used to find these problems which may have been overlooked in the development of the source code.

Code review is often part of a version-controlled source code repository. A version-controlled source code repository manages changes to the files of a file system. Each developer obtains a full copy of the files in the repository in their own branch. The original code is typically stored in a master branch in a separate computing device. The developer makes changes to their version of a file of the repository. The change to the file is noted in a commit. Before a change is merged back into the original file, the change is reviewed using the code review process.

The code review process is initiated from issuance of a pull request. A pull request is a request to merge one or more commits into a different branch of the repository, such as the master branch. Peers or reviewers review the code changes and provide comments or suggestions. The developer may make additional changes to the code based on the comments submitted by the peers. The pull request is then approved and the changes are merged into the main branch of the source code repository or discarded.

The code changes are typically in a code diff format. The code diff format shows the changes between two files, such as the original source code and the revised version of the original source code in sequences of lines common to both files, interspersed with groups of differing lines. A code diff hunk is a sequence of changed source code lines, including deleted lines, surrounded by a few unchanged lines or context. The code diff format is an efficient representation of the code changes since the unchanged lines occur only once. The code diff format includes diff characters at the beginning of each line. The diff characters denote changes with "–" and "+" tags and no changes with a blank space. The use of the code diff format to represent the code changes and code review is beneficial since the model is better able to learn code changes. The code diff hunks are a compact and convenient format for showing the code before and the code after the change which includes the editing steps at a given granularity, such as at the line level.

The code review prompt service receives code diff hunks of a target source code snippet (block 302). The target source code snippet may be a method or an entire source code program. A source code snippet may include several code diff hunks based on the number of changes made to the snippet.

A code quality classifier model processes the code diff hunk to determine if the code diff hunk is likely to have a code quality issue and need a code review (block 304). A code quality issue may be a software bug, a code formatting issue, and the like. The code quality classifier model receives an embedding of the code diff hunk and outputs a probability value which is interpreted as Yes or No. (Collectively, block 304).

In an aspect, the code quality classifier model may be implemented as a neural encoder transformer model with attention. The neural encoder transformer model is pre-trained on unsupervised source code snippets and fine-tuned on labeled samples of code diff hunks representing code changes with and without code quality issues. (Collectively, block 304).

The code review prompt service selects the top-k code diff hunks most likely needing a code review, where k is a preconfigured value. The selection is based on the probability associated with each code diff hunk output by the code quality classifier model and the code diff hunks having the highest probability are selected. (Collectively, block 306).

The code review prompt service processes each of the top-k code diff hunks (block 308). An embedding of the code diff hunk is generated by the encoder (block 310) and used to search the retrieval-augmented data store for code reviews associated with closely-matching code diff hunk embeddings (block 312). A select number of the code reviews having code diff hunk embeddings close to the code review of the request are obtained from the retrieval-augmented data store (block 312).

The prompt is generated from the prompt template and includes code reviews from the retrieval-augmented data store (block 314). Turning to FIG. 4, there is shown an exemplary code review prompt template 400. The prompt template 400 includes the initial version of the source code snippet 402, the proposed code diff hunk 404, code reviews associated with similar code changes 406 and instructions describing the task and the expected output format 408.

The prompt is sent to the large language model (block 316) and the code review prompt service receives the code review from the large language model (block 318). The code review prompt service outputs the code review (block 318) and asks the client if repair code is needed (block 320). In the event the repair code is needed (block 320—yes), the code review prompt service continues the conversation with the large language model and generates another prompt to send to the model (block 324). The second prompt includes the first prompt and the response from the first prompt since the large language model does not retain the state of the conversation. The prompt includes additional instructions on the task to be performed and the expected output (block 324). If there is no need for a repair (block 320—no), the process continues with processing the next code diff hunk until all the code diff hunks are processed (block 322).

Figure 5:
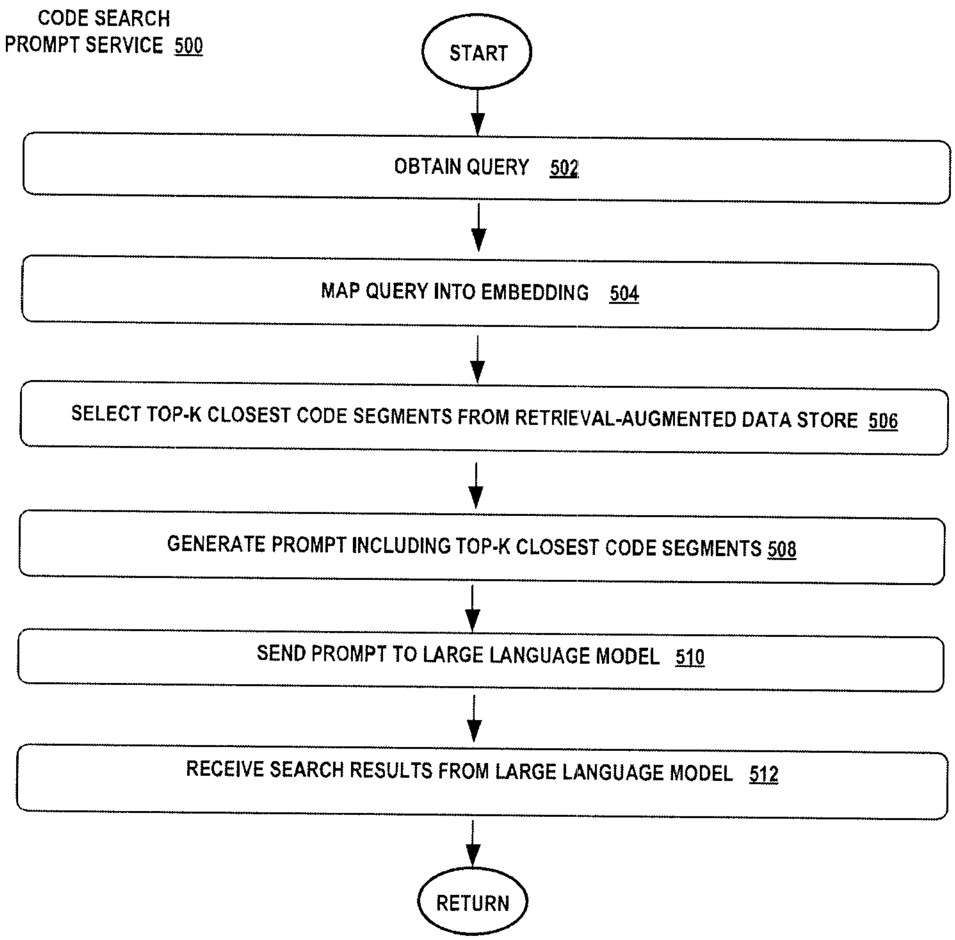
FIG. 5 is a flow diagram illustrating an exemplary method of the code search prompt service.

Attention now turns to a further description of the code search prompt service. Turning to FIG. 5, there is shown an exemplary method 500 of the code search prompt service. The code search prompt service receives a request containing a query describing the subject of the search (block 502). The code search prompt service generates an embedding of the query using the encoder model (block 504). The embedding of the query is used as the retrieval-augmented index into the retrieval-augmented data store to find the top-k code segments associated with embeddings that closely-match the embedding of the query where k is a preconfigured value (block 506). The top-k code segments are selected based on the similarity score of the embedding query to the code segment embedding. Those code segments have a high similarity score are selected.

The code search prompt service then generates a prompt based on a prompt template and contains the top-k code segments (block 508). Referring to FIG. 6, there is shown an exemplary prompt template for a code search 600. The prompt template 600 includes the code search examples retrieved from the retrieval-augmented data store 604, <Reference #1>, . . . , <Reference #k>, with a description 602, an instruction 606 specifying the task for the large language model to perform, and the search query, <Question> 608.

Referring back to FIG. 5, a large language model has a fixed-length context window size that the prompt cannot exceed. In the event the size of the prompt exceeds the context window size of the large language model, the top-k references having the lowest similarity score are replaced with their method signature instead of the entire code segment. (Collectively, block 508).

The prompt is sent to the large language model (block 510) and the model returns a response which is output (block 512).

Attention now turns to a further description of the vulnerability repair prompt service. Turning to FIG. 7, there is shown an exemplary method 700 of the vulnerability repair prompt service. The vulnerability repair prompt service receives a request that includes a query and a source code snippet (block 702). The query indicates that the task is to detect vulnerabilities in the source code snippet. A static analyzer analyzes the source code snippet to determine whether or not the source code snippet contains a vulnerability (block 704). The static analyzer identifies the vulnerability type and the location of the vulnerability in the source code snippet. The vulnerability repair prompt service generates an embedding of the vulnerability type using the encoder model (block 706). The embedding of the vulnerability type is used to find the top-k closest matching embeddings in the retrieval-augmented index. The top-k closest matching embeddings in the retrieval-augmented index point to repair code in the retrieval-augmented data store used to repair the same vulnerability type (block 708). In an aspect, the repair code is in the code diff format.

A prompt is generated using a prompt which includes the vulnerable code, the top-k repair code examples, the vulnerable source code snippet, the vulnerability type, and the tokens attributable to the vulnerability (block 710). Turning to FIG. 8, there is shown an exemplary vulnerability prompt based on a prompt template 800 for a security vulnerability. The prompt includes a description of the task 802, the top-k vulnerability fixes in a code diff format 804, the code snippet containing the vulnerability with its surrounding context from the source code program 806, and instructions describing the action the large language model is to perform and the output format of the response.

Turning back to FIG. 7, the prompt is sent to the large language model (block 712) and a vulnerability fix is returned (block 714). The vulnerability repair prompt service applies the vulnerability fix to the vulnerable source code snippet, compiles the entire source code program and executes unit tests associated with the source code program (block 716). In the event the vulnerability fix fails to compile or pass a unit test (block 718—yes), the vulnerability repair prompt service generates a second prompt to the large language model (block 722). The second prompt includes the first prompt and its response in addition to a new set of instructions that indicate that the vulnerability fix failed, the reason for the failure and a request to generate a new fix (block 722).

The vulnerability repair prompt service sends the second prompt to the large language model and receives a new fix (block 724). The vulnerability repair prompt service repeats the same post-processing step (block 716) until the vulnerability fix compiles successfully and passes the associated unit tests (block 718—no). When the vulnerability fix passes the post-processing step (block 718—no), then the repaired code is output (block 720).

Figure 9:
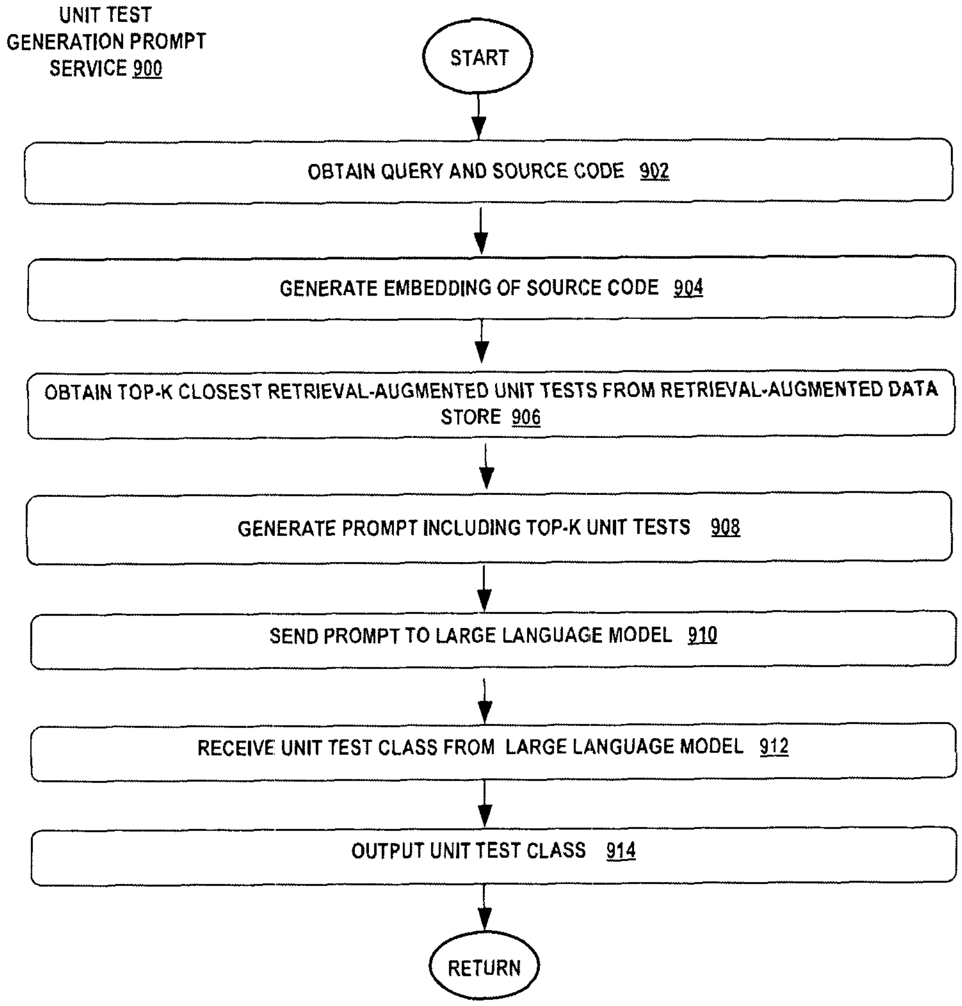
FIG. 9 is a flow diagram illustrating an exemplary method of the unit test generation prompt service

Attention now turns to a further description of the unit test generation prompt service. Turning to FIG. 9, there is shown an exemplary method 900 of the unit test generation prompt service. The unit test generation service receives a query indicating that a unit test is needed for a particular source code program (block 902). The unit test generation service searches for the top-k unit tests that are similar to the source code program. An embedding of the source code program is generated using the encoder model (block 904) and the embedding is used to search the retrieval-augmented index for closely matching embeddings that are associated with unit tests stored in the retrieval-augmented data store (block 906).

A prompt is generated using a unit test generation prompt template for the programming language associated with the source code program (block 908). The prompt includes instructions describing the task, the source code program, and the top-k unit tests closely associated with the source code program (block 908). The prompt is sent to the large language model (block 910) and a unit test class is received (block 912) which is output (block 914).

Figure 10:
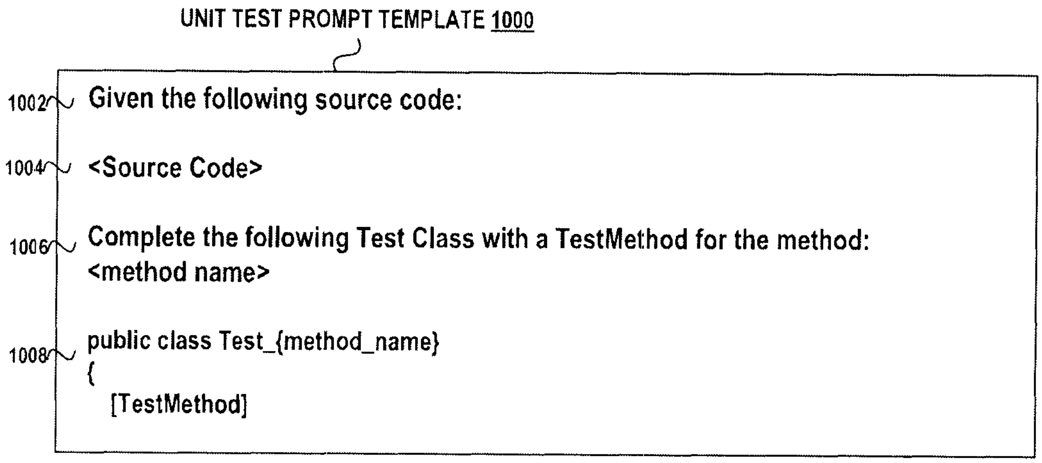
FIG. 10 is a schematic diagram illustrating an exemplary unit test generation prompt template.

Turning to FIG. 10, there is shown an exemplary unit test generation prompt template 1000. There is a different unit test prompt template for each programming language. The unit test prompt includes the source code subject to the unit test 1002-1004, an instruction to generate the test class for each method in the source code program 1006, and an output format 1008 which includes the start of the test class source code in a specific programming language.

Technical Effect

Aspects of the subject matter disclosed herein pertain to the technical problem of crafting a prompt for a large language model to perform a specific software engineering task. The technical features associated with addressing this problem is a web service that automates the construction of a prompt containing the requisite information needed for the large language model to generate a meaningful response. The technical effect achieved is the enhanced accuracy of the response without additional computational burden.

The operations used in this technique need to be performed on a computing device. Hence, the operations performed are inherently digital. A human mind cannot interface directly with a CPU, or network interface card, or other processor, or with RAM or digital storage, to read and write the necessary data and perform the necessary operations and processing steps taught herein.

Embodiments are also presumed to be capable of operating "at scale", that is capable of handling larger volumes, in production environments or in testing labs for production environments as opposed to being mere thought experiments.

Exemplary Operating Environment

Figure 11:
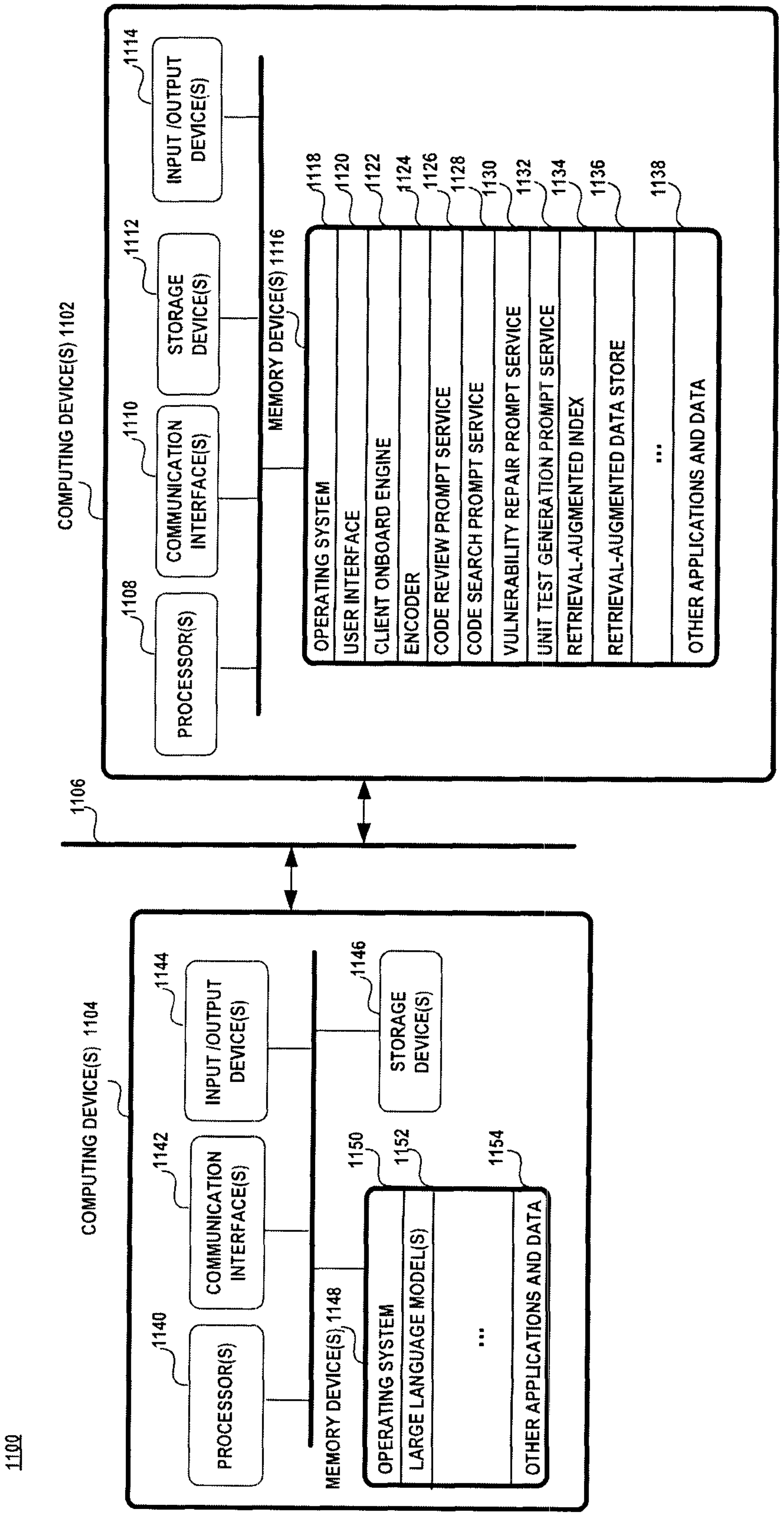
FIG. 11 is a block diagram illustrating an exemplary operating environment.

Attention now turns to a discussion of an exemplary operating environment. FIG. 11 illustrates an exemplary operating environment 1100 in which one or more computing devices 1102, 1104 are used in a customized prompt generation system. In one aspect, the customized prompt generation service operates on one set of computing devices 1102 and the large language models operate on a second set of computing devices 1104. However, it should be noted that the aspects disclosed herein are not constrained to any particular configuration of devices and the entire technique may be performed on a single computing device.

The computing devices 1102, 1104 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 1100 may be configured in a network environment, a distributed environment, a multi-processor environment, or a stand-alone computing device having access to remote or local storage devices.

The computing devices 1102, 1104 may include one or more processors 1108, 1140, one or more communication interfaces 1110, 1142, one or more storage devices 1112, 1146, one or more input/output devices 1114, 1144, and one or more memory devices 1116, 1148. A processor 1108, 1140 may be any commercially available or customized processor and may include dual microprocessors and multi-processor architectures. A communication interface 1110, 1142 facilitates wired or wireless communications between the computing devices 1102, 1104 and other devices. A storage device 1112, 1146 may be computer-readable medium that does not contain propagating signals, such as modulated data signals transmitted through a carrier wave. Examples of a storage device 1112, 1146 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 1112, 1146 in the computing devices 1102, 1104. The input/output devices 1114, 1144 may include a keyboard, mouse, pen, voice input device, touch input device, display, speakers, printers, etc., and any combination thereof.

A memory device 1116, 1148 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory device 1116, 1148 may also include one or more external storage devices or remotely located storage devices that do not pertain to propagated signals, such as modulated data signals transmitted through a carrier wave.

The memory device 1116, 1148 may contain instructions, components, and data. A component is a software program that performs a specific function and is otherwise known as a module, program, component, and/or application. The memory device 1116 may include an operating system 1118, a user interface 1120, a client onboard engine 1122, an encoder 1124, a code review prompt service 1126, a code search prompt service 1128, a vulnerability repair prompt service 1130, a unit test generation prompt service 1132, a retrieval-augmented index 1134, a retrieval-augmented data store 1136 and other applications and data 1138. The memory device 1148 may include an operating system 1150, large language models 1152, and other applications and data 1154.

The computing devices 1102, 1104 may be communicatively coupled via a network 1106. The network 1106 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portion of the Public Switched Telephone Network (PSTN), plain old telephone service (POTS) network, a wireless network, a WiFi® network, or any other type of network or combination of networks.

The network 1106 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra-Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

Conclusion

A system is disclosed for automatic generation of a prompt with customized data. The system comprises: a processor; and a memory that stores a program configured to be executed by the processor. The program includes instructions that perform acts to: provide a plurality of services, wherein each service generates a prompt to a large language model for a select software engineering task to be performed by the large language model, wherein each service of the plurality of services is associated with a prompt template, wherein the prompt template identifies content to be included in the prompt; receive a request to perform a first software engineering task using the large language model, wherein the request is associated with a client; obtain a prompt template associated with the first software engineering task; obtain a retrieval-augmented example of the first software engineering task from custom data of the client; generate an initial prompt for the large language model to perform the first software engineering task based on the prompt template, wherein the initial prompt includes the content specified in the prompt template and the retrieval-augmented example of the first software engineering task from the custom data of the client; and transmit the initial prompt to the large language model for the large language model to perform the first software engineering task given the content of the initial prompt.

In an aspect, the program includes instructions that perform acts to: obtain a response from the large language model; and check accuracy of the response. In an aspect, the program includes instructions that perform acts to: generate a second prompt to the large language model when the response to the first prompt contains an erroneous response, wherein the second prompt includes the first prompt, the response to the first prompt, and instructions to correct the response to the first prompt.

In an aspect, the plurality of services comprises a code review prompt service, a code search prompt service, a vulnerability detection prompt service, and/or a unit test generation prompt service. In an aspect, the program includes instructions that perform acts to: store the custom data in a retrieval-augmented data store, wherein an item in the retrieval-augmented data store is associated with an embedding used to retrieve the item. In an aspect, the retrieval-augmented data store includes custom data of the client comprising code segments, unit tests, code reviews, and code diff hunks. In an aspect, the large language model is a neural transformer model with attention. In an aspect, the large language model is a conversational generative pre-trained neural transformer model with attention.

A computer-implemented method for automatic generation of a prompt with customized data is disclosed, comprising: hosting a plurality of web services, wherein a web service is associated with generating a prompt to a large language model to perform a specified software engineering task, wherein a web service is associated with a prompt template specifying content to be included in the prompt; hosting customized data of a client, wherein the customized data comprises source code artifacts from a codebase of the client; receiving a request to perform an action on a first source code artifact of the client; identifying a first software engineering task to perform the requested action; obtaining from the customized data of the client, a first source code artifact from the codebase of the client illustrating the first software engineering task; generating a first prompt to the large language model to perform the first software engineering task based on the content of the prompt template associated with the first software engineering task, wherein the first prompt includes the first source code artifact of the client; transmitting the first prompt to the large language model; and receiving a response from the large language model including an output of the first software engineering task.

In an aspect, the computer-implemented method, further comprises: processing the output of the first software engineering task for accuracy; and upon determining the output is accurate, outputting the output of the first software engineering task. In an aspect, the computer-implemented method of claim 9, further comprises: processing the output of the first software engineering task for compliance with the request; upon determining the output is non-compliant, generating a second prompt to correct the response, wherein the second prompt includes the first prompt and the response to the first prompt.

In an aspect, the computer-implemented method, further comprises: accessing the first source code artifact of the client utilizing an embedding associated with the request having a closest similarity to an embedding of the first source code artifact. In an aspect, the source code artifacts comprise code changes made to the codebase, code segments of the codebase, unit tests, and/or code reviews. In an aspect, the plurality of web services comprises a code review prompt service, a code search prompt service, a vulnerability detection prompt service, and/or a unit test generation prompt service. In an aspect, the large language model is a conversational generative pre-trained neural transformer model with attention.

A hardware storage device is disclosed having stored thereon computer-executable instructions that are structured to be executed by a processor of a web service to cause the web service to perform acts to: store a plurality of prompt templates, each prompt template associated with a software engineering task and specifies content to be included in a prompt for a large language model to perform the associated software engineering task; store a customized data of a client; receive a request to perform a first software engineering task; retrieve the customized data of the client associated with the first software engineering task; generate a first prompt containing the content specified in the prompt template for the first software engineering task and the customized data of the client associated with the software engineering task; and obtain an output of the software engineering task from the large language model given the first prompt.

In an aspect, the hardware storage device having stored thereon computer-executable instructions that cause the web service to perform acts to: generate an embedding for the customized data to serve as an index to access the customized data. In an aspect, software engineering task comprises code review generation, unit test generation, vulnerability detection, or code search. In an aspect, the customized data includes code changes, code reviews, unit tests, code segments, and/or repair code from a codebase of the client. In an aspect, the large language model is a conversational generative pre-trained neural transformer model with attention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system for automatic generation of a prompt with customized data, said system comprising:

one or more processors; and one or more hardware storage devices that store instructions that are executable by the one or more processors to cause the system to:

provide a plurality of services, wherein each service is configured to generate a prompt to a large language model for a select software engineering task to be performed by the large language model, wherein each service of the plurality of services is associated with a prompt template, and wherein the prompt template identifies content to be included in the prompt;

receive a request to perform a first software engineering task using the large language model, wherein the request is associated with a client, and wherein the first software engineering task includes identifying a vulnerability in source code;

obtain a prompt template associated with the first software engineering task;

obtain a retrieval-augmented example of the first software engineering task from custom data of the client;

generate an initial prompt for the large language model to perform the first software engineering task based on the prompt template, wherein the initial prompt includes the content specified in the prompt template and the retrieval-augmented example of the first software engineering task from the custom data of the client;

transmit the initial prompt to the large language model for the large language model to perform the first software engineering task given the content of the initial prompt;

in response to identifying the vulnerability in the source code, determine a vulnerability type for the vulnerability;

generate an embedding for the vulnerability type;

use the embedding for the vulnerability type to find a top-k closest matching set of embeddings within a retrieval-augmented index, wherein the top-k closest matching set of embeddings identified within the retrieval-augmented index are ones that point to repair code that is usable to repair vulnerabilities classified as having the same vulnerability type, such that said vulnerability is potentially repairable using one or more of the top-k closest matching set of embeddings; and compile the repair code and determine whether a unit test is attached in the request, wherein, when the repair code does not compile successfully or when the unit test is not executed successfully, a given service continues conversation with the large language model to fix the repair code.

2. The system of claim 1, wherein the instructions are further executable to cause the system to:

obtain a response from the large language model; and check accuracy of the response.

3. The system of claim 2, wherein the instructions are further executable to cause the system to:

generate a second prompt to the large language model when the response to the first prompt contains an erroneous response, wherein the second prompt includes the first prompt, the response to the first prompt, and instructions to correct the response to the first prompt.

4. The system of claim 1, wherein the plurality of services comprises a code review prompt service, a code search prompt service, a vulnerability detection prompt service, and/or a unit test generation prompt service.

5. The system of claim 1, wherein the instructions are further executable to cause the system to:

store the custom data in a retrieval-augmented data store, wherein an item in the retrieval-augmented data store is associated with a second embedding used to retrieve the item.

6. The system of claim 5, wherein the retrieval-augmented data store includes custom data of the client comprising code segments, unit tests, code reviews, and code diff hunks.

7. The system of claim 1, wherein the large language model is a neural transformer model with attention.

8. The system of claim 1, wherein the large language model is a conversational generative pre-trained neural transformer model with attention.

9. A computer-implemented method for automatic generation of a prompt with customized data, said method comprising:

hosting a plurality of web services, wherein a web service is associated with generating a prompt to a large language model to perform a specified software engineering task, wherein a web service is associated with a prompt template specifying content to be included in the prompt;

hosting customized data of a client, wherein the customized data comprises source code artifacts from a codebase of the client;

receiving a request to perform an action on a first source code artifact of the client;

identifying a first software engineering task to perform the requested action, wherein the first software engineering task includes identifying a vulnerability in the first source code artifact;

obtaining, from the customized data of the client, the first source code artifact from the codebase of the client illustrating the first software engineering task;

generating a first prompt to the large language model to perform the first software engineering task based on the content of the prompt template associated with the first software engineering task, wherein the first prompt includes the first source code artifact of the client;

transmitting the first prompt to the large language model;

receiving a response from the large language model including an output of the first software engineering task;

in response to identifying the vulnerability in the first source code artifact, determining a vulnerability type for the vulnerability;

generating an embedding for the vulnerability type;

using the embedding for the vulnerability type to find a top-k closest matching set of embeddings within a retrieval-augmented index, wherein the top-k closest matching set of embeddings identified within the retrieval-augmented index are ones that point to repair code that is usable to repair vulnerabilities classified as having the same vulnerability type, such that said vulnerability is potentially repairable using one or more of the top-k closest matching set of embeddings; and compiling the repair code and determining whether a unit test is attached in the request, wherein, when the repair code does not compile successfully or when the unit test is not executed successfully, a given service continues conversation with the large language model to fix the repair code.

10. The computer-implemented method of claim 9, further comprising:

processing the output of the first software engineering task for accuracy; and upon determining the output is accurate, outputting the output of the first software engineering task.

11. The computer-implemented method of claim 9, further comprising:

processing the output of the first software engineering task for compliance with the request;

upon determining the output is non-compliant, generating a second prompt to correct the response, wherein the second prompt includes the first prompt and the response to the first prompt.

12. The computer-implemented method of claim 9, further comprising:

accessing the first source code artifact of the client utilizing a second embedding associated with the request having a threshold level of similarity relative to a third embedding of the first source code artifact.

13. The computer-implemented method of claim 9, wherein the source code artifacts comprise code changes made to the codebase, code segments of the codebase, unit tests, and/or code reviews.

14. The computer-implemented method of claim 9, wherein the plurality of web services comprises a code review prompt service, a code search prompt service, a vulnerability detection prompt service, and/or a unit test generation prompt service.

15. The computer-implemented method of claim 9, wherein the large language model is a conversational generative pre-trained neural transformer model with attention.

16. A hardware storage device storing computer-executable instructions that are structured to be executed by a processor of a web service to cause the web service to:

store a plurality of prompt templates, each prompt template associated with a software engineering task and specifies content to be included in a prompt for a large language model to perform the associated software engineering task;

store a customized data of a client;

receive a request to perform a first software engineering task that includes identifying a vulnerability in source code;

retrieve the customized data of the client associated with the first software engineering task;

generate a first prompt containing the content specified in the prompt template for the first software engineering task and the customized data of the client associated with the software engineering task;

obtain an output of the software engineering task from the large language model given the first prompt;

in response to identifying the vulnerability in the source code, determine a vulnerability type for the vulnerability;

generate an embedding for the vulnerability type;

use the embedding for the vulnerability type to find a top-k closest matching set of embeddings within a retrieval-augmented index, wherein the top-k closest matching set of embeddings identified within the retrieval-augmented index are ones that point to repair code that is usable to repair vulnerabilities classified as having the same vulnerability type, such that said vulnerability is potentially repairable using one or more of the top-k closest matching set of embeddings; and compile the repair code and determine whether a unit test is attached in the request, wherein, when the repair code does not compile successfully or when the unit test is not executed successfully, a given service continues conversation with the large language model to fix the repair code.

17. The hardware storage device of claim 16, wherein the instructions are further executable to cause the web service to:

generate a second embedding for the customized data to serve as an index to access the customized data.

18. The hardware storage device of claim 16, wherein the software engineering task comprises code review generation, unit test generation, vulnerability detection, or code search.

19. The hardware storage device of claim 16, wherein the customized data includes code changes, code reviews, unit tests, code segments, and/or repair code from a codebase of the client.

20. The hardware storage device of claim 16, wherein the large language model is a conversational generative pre-trained neural transformer model with attention.

* * * * *